United States Patent [19]

Martin

[11] Patent Number: 4,917,159

[45] Date of Patent: Apr. 17, 1990

[54] LONGITUDINAL WOOD PEELING MACHINE AND A WOOD PEELING INSTALLATION

[76] Inventor: Michel Martin, 23, rue de Turin, 75008 Paris, France

[21] Appl. No.: 291,539

[22] Filed: Dec. 28, 1988

[30] Foreign Application Priority Data

Dec. 28, 1987 [FR] France ................................ 8718226

[51] Int. Cl.$^4$ .............................................. B27C 1/00
[52] U.S. Cl. .................................... 144/175; 144/120; 269/21
[58] Field of Search ............... 144/120, 155, 156, 157, 144/158, 159, 160, 161, 175, 184; 269/21

[56] References Cited

U.S. PATENT DOCUMENTS

| | | | |
|---|---|---|---|
| 1,064,870 | 6/1913 | Tegtmeyer | 144/120 |
| 2,720,230 | 7/1953 | Lockwood et al. | |
| 3,441,069 | 4/1969 | Koss | |
| 3,907,268 | 9/1975 | Hale | |
| 3,998,252 | 12/1976 | Senba | 144/175 |
| 4,503,892 | 3/1985 | Conner | 144/120 |
| 4,589,456 | 5/1986 | Traben | 144/120 |

FOREIGN PATENT DOCUMENTS

| | | |
|---|---|---|
| 2320898 | 11/1974 | Fed. Rep. of Germany . |
| 1076268 | 10/1954 | France . |
| 1590933 | 5/1970 | France . |
| 2135906 | 12/1972 | France . |
| 2274525 | 1/1976 | France . |

*Primary Examiner*—W. Donald Bray

[57] ABSTRACT

The invention provides a longitudinal wood peeling machine and a wood peeling installation comprising at least one such machine. In this wood peeling machine of the type comprising an inlet table and an outlet table with a knife forming an angle of about 10° with the advancing direction of the green balk to be peeled, said tables are thin, have the same thickness and advantageously an upper suction surface and are heated, a plate adjustable in height and disposed below the tables for receiving the cut veneers and being preferably driven in synchronism with the balk.

10 Claims, 3 Drawing Sheets

LONGITUDINAL WOOD PEELING MACHINE AND A WOOD PEELING INSTALLATION

BACKGROUND OF THE INVENTION

The present invention relates to a longitudinal wood peeling or veneer cutting machine, i.e. a machine in which a log cut from green undressed timber and named hereafter "balk" to be cut, is introduced endwise and driven longitudinally against a knife forming an angle of about 10° with the advancing direction of the balk, which corresponds obviously to the orientation of the fibers or grain of the wood so that the splitting effect is almost zero whereas the cutting effect is maximum, which makes it possible to obtain veneers of truly constant thickness having excellent mechanical qualities and with two glazed surfaces without any conventional defects, such as split open face or torn closed face, which usually result from transverse wood peeling or cutting, whether it is horizontal or vertical.

The invention also relates to a wood peeling installation comprising at least one longitudinal peeling machine of the invention.

In the field of longitudinal wood peeling machines, at the present time a machine is known formed by a very thick table fixed to a solid frame, the balk to be peeled being generally in the form of a plank or square or rectangular cross section timber whose thickness cannot exceed 200 mm and which is driven longitudinally, e.g. by means of an upper belt pressed on the wood. The veneer coming from this peeling machine abuts against the end of the frame so that, despite the presence of a lower spout shaped metal sheet guide, said veneer leaves the machine laterally and in a spiral and falls in a perfectly haphazard direction on the loose pile of previously cut veneers, the veneers thus obtained not even being able to be stacked manually for subsequent drying because they are twisted independently of each other on leaving this known peeling machine.

SUMMARY OF THE INVENTION

The present invention overcomes these drawbacks by providing a longitudinal peeling machine making it possible to obtain directly dry and perfectly flat veneers perfectly stacked geometrically.

Furthermore, a peeling installation of the invention, which comprises at least one longitudinal peeling machine in accordance with the invention, makes it possible to attain a very high production rate in the number of perfect veneers per minute, whereas the drive force required is much lower than in the case of horizontal or vertical transverse peeling machines and veneer cutters, since these latter only provide veneers with numerous defects.

In accordance with the invention, in a longitudinal veneer peeling machine in which the cutting table comprises an inlet table and an outlet table with a knife embedded adjustably in its front part, the inlet and outlet tables are thin having exactly the same thickness and a reception and stacking plate for the peeled veneers, adjustable in height, is disposed below the cutting table assembly, the upper surface of said plate or of the last previously peeled veneer being substantially at the height of the lower surface of the inlet table, the upper and lower surfaces of said thin inlet table determining respectively two superimposed stages, namely, an upper peeling stage corresponding to the lower face of the balk before peeling of the veneer in progress and a lower reception and stacking stage corresponding to the upper face of the plate or of the last previously peeled veneer.

In accordance with another essential feature of the longitudinal peeling machine of the invention, the reception and stacking plate is movable longitudinally and is connected to the balk drive means so as to be driven exactly in synchronism with said balk, so that the lower face of the balk being peeled and the upper face of the plate or of the last previously peeled veneer are driven exactly in synchronism along the two superimposed stages, said plate being possibly flexible.

Furthermore, each of the inlet and outlet tables may comprise a network of channels opening here and there into the upper surface of said table, the two networks being connected to a vacuum pump so as to form a means of applying and holding the balk against the cutting table, the drive means for this latter in the longitudinal advancing direction being reduced to a pushing device.

Finally, each of the inlet and outlet tables may comprise a network of channels closed at their ends through which a heating fluid flows, the two networks being connected to a device for heating and pumping the fluid intended to heat the inlet table and the outlet table with the associated knife.

Also in accordance with the invention, in a veneer peeling installation comprising at least one longitudinal peeling machine such as defined above, said peeling machine is mounted fixedly in a rectilinear portion of a closed circuit with two superimposed stages respectively on a level with the two superimposed stages of the peeling machine and comprising an upper horizontal track disposed on a level with the upper peeling stage of the peeling machine and intended to support a train of rigid identical mobile frames, each of which is connected to the preceding one and to the following one and comprises a means for fixing a balk to be peeled longitudinally and laterally inside said frame, and a lower horizontal track for supporting a train of rigid identical mobile carriages, each of which is connected to the preceding one and to the following one and carries a raising table comprising a plate which may be flexible and supported by an air cushion in which said plate, adjustable in height and intended for receiving and stacking peeled veneers, is adjusted so that the upper face of said plate or of the last previously peeled veneer is disposed on a level with the lower reception and stacking stage of the peeling machine, the number of frames being equal to the number of carriages, each frame being superimposed on a carriage and a drive means being provided for driving the trains of frames and carriages exactly in synchronism on their respective tracks, the upper track comprising a green timber loading station and the lower track comprising a station for unloading the flat and dried stacks of peeled veneers.

BRIEF DESCRIPTION OF THE DRAWINGS

Other features and advantages of the longitudinal wood peeling machine and of the associated peeling installation of the invention will be better understood from the following description, with reference to the accompanying drawings in which.

In these drawings, the same references designate the same elements.

DESCRIPTION OF THE PREFERRED EMBODIMENTS

Figure 1:
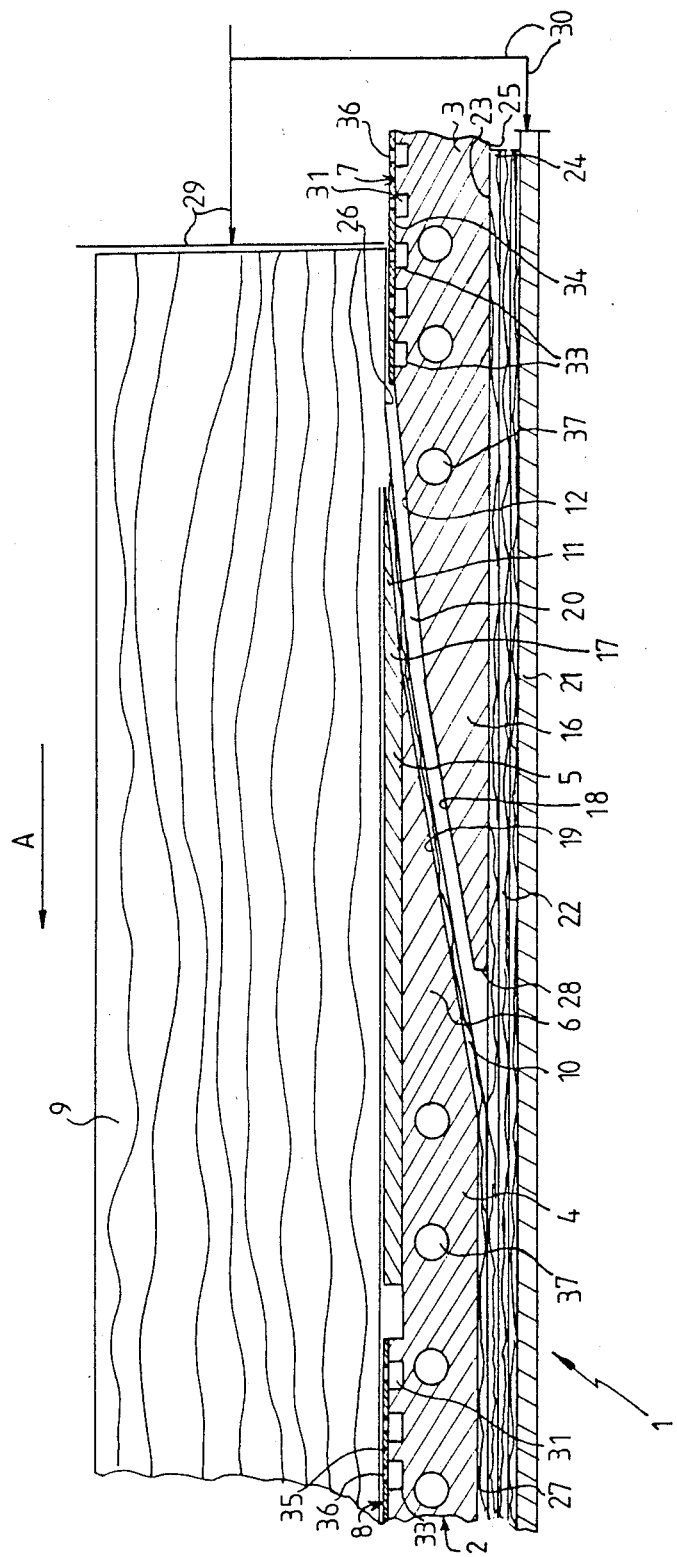
FIG.1 shows a partial longitudinal sectional view of the peeling machine supporting a balk at the end of peeling and of the associated plate for receiving and stacking the peeled veneers.
Figure 2:
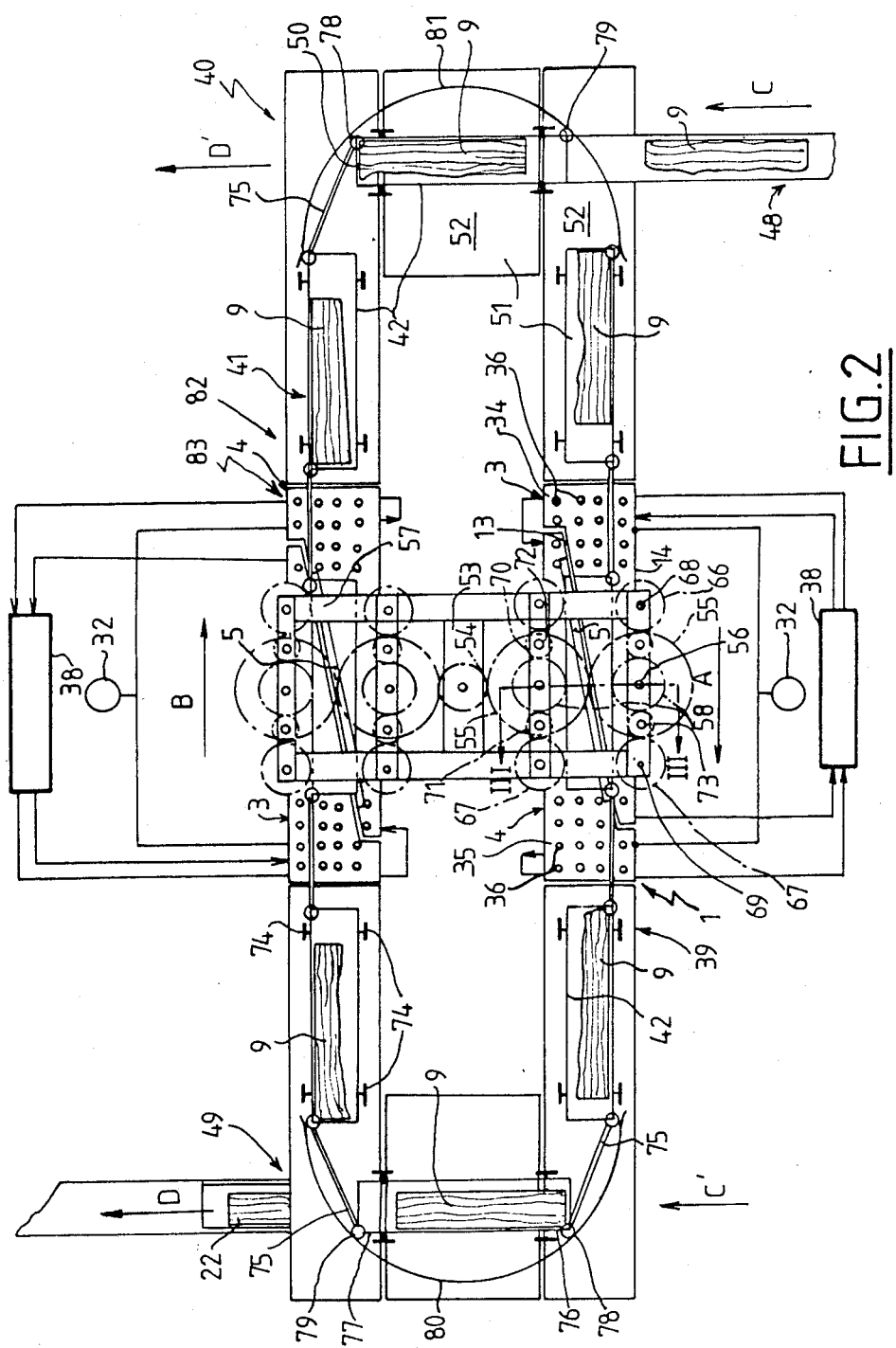
FIG. 2 shows a schematic top view of a peeling installation having two longitudinal peeling machines such as the one shown in FIG. 1, the frames situated at the level of said peeling machines being shown in a very simplified way and without a balk for the sake of clarity.
Figure 3:
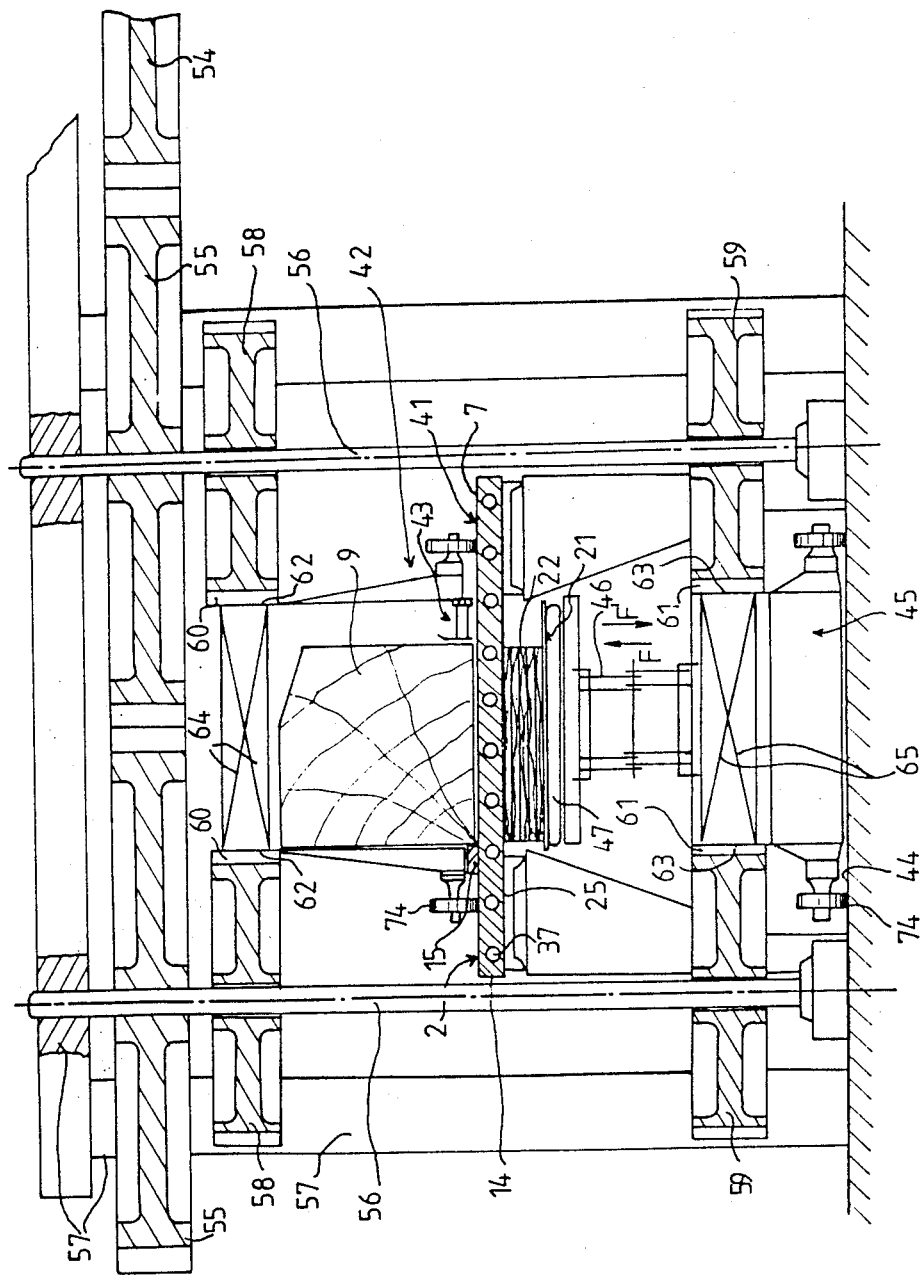
FIG. 3 shows a partial sectional view through line 3—3 of FIG. 2, the knife and the slit in the cutting table as well as the veneer during peeling not being shown for the sake of simplicity.

Referring to FIGS. 1 to 3, and more particularly to FIG. 1, a longitudinal wood peeling machine, which is designated generally by 1, is of the type comprising a cutting table 2, generally rectangular and formed by an inlet table 3 and an outlet table 4, the latter having a knife 5 embedded adjustably in a way known per se in its front part 6. The respective upper surfaces 7 and 8 of the inlet 3 and outlet 4 tables are obviously flat and horizontal and are intended to support in a way known per se a green undried balk of timber 9, preferably squared, during its advance in the direction of arrow A shown in FIG. 1. More precisely, the upper surface 7 of the inlet table 3 supports balk 9 before peeling of a veneer 10 whereas the upper surface 8 of the outlet table 4 supports it after the veneer has been peeled.

As is known, in the field of longitudinal peeling machines, the two upper surfaces 7 and 8, or more exactly the inlet 3 and outlet 4 tables are adjustable in height with respect to each other depending on the thickness of the veneer to be cut. Furthermore, the cutting edge 11 of knife 5 and the rear face 12 of the inlet table 3, which may be formed by an embedded compression bar, not shown, are disposed facing each other along a diagonal 3 of the cutting table 2, which forms an angle of about 10° with the advancing direction of balk 9, the latter being obviously longitudinal with respect to the general direction of the fibers, i.e. the grain of the wood.

Moreover, a longitudinal peeling machine includes, in a way known per se, a means not show for driving balk 9 in said longitudinal advancing direction and also a means, generally vertical not shown, for applying and holding the balk 9 against the horizontal cutting table 2. Furthermore, referring to FIGS. 2 and 3, the cutting table 2 must comprise, at the level of its external longitudinal edge 14 opposite knife 5, a lateral alignment stop 15 for maintaining balk 9 in said longitudinal advancing direction during peeling.

Finally, again referring to FIG. 1, the rear part 16 of the inlet table 3 and the respective front parts 17 and 6 of knife 5 and of the outlet table 4 comprise facing surfaces with complementary shapes, which are designated respectively by 18, 19 and which define therebetween an oblique slit 20 for discharging the veneer 10 being peeled downwards.

In accordance with another essential feature of the longitudinal peeling machine of the invention, the inlet 3 and outlet 4 tables are thin have exactly the same thickness, about 100 mm for example. In addition, plate 21 for receiving and stacking the peeled veneers 22 is disposed below the cutting table 2 assembly, this plate 21 being adjustable in height, in a way known per se, so that the upper surface of said plate 21 or of the last previously peeled veneer 24 is substantially at the height of the lower surface 25 of the inlet table 3. More precisely, the upper 7 and lower 25 surfaces of said thin inlet table 3 determine respectively two superimposed stages, namely an upper peeling stage 7 corresponding to the lower face 26 of the balk 9 before peeling of the veneer in progress 10 and a lower reception and stacking stage 25 corresponding to the upper face 23 of plate 21 or of the last previously peeled veneer 24.

In addition, it is obvious that the upper 8 and lower 27 surfaces of the outlet table 4 are offset upwards with respect to the upper 7 and lower 25 surfaces of the inlet table 3, as a function of the adjustment associated with the desired thickness for the veneer 10 being peeled.

Because of the small thickness of the cutting table 2 and because of the presence of plate 21 for receiving and stacking the peeled veneers of the invention, the front end of the veneer 10 being peeled meets no obstacle during its advancing movement. In fact, after being separated from balk 9 by the cutting edge 11 of knife 5 and after passing through the oblique downward discharge slit, said front end of the veneer 10 being peeled penetrates and slides in the horizontal space zone, because of the difference in height between the inlet 3 and outlet 4 tables, between the lower surface 27 of the inlet table 4 and the upper surface 23 of plate 21 or of the last previously peeled veneer 24. Taking into account the fact that all said surfaces are perfectly polished and "glazed", the veneer 10 being peeled slides substantially freely as the balk 9 with which it is still fast advances. Consequently, said veneer 10 remains substantially in the axis of and below balk 9 while moving longitudinally therewith to the end of the peeling pass.

However, as soon as peeling is finished and as soon as veneer 10 is no longer fast with balk 9 and is materially separated therefrom, said veneer is no longer driven by the balk 9 and it stops immediately, its rear part being still engaged in the oblique discharge slit 10. Consequently, it is necessary for the veneer which has just been cut to clear said slit 20 before the next peeling pass, failing which, at the beginning of peeling, the head of the next veneer will be engaged in the still encumbered oblique slit 20 and will strike the heel of the previously peeled veneer, thus causing damage to one and/or the other veneer and malfunction of the machine.

To avoid this risk, it is then essential for the veneer which has just been cut to completely free the discharge slit 20 as each peeling pass is finished. This result may obviously be obtained manually, the flat veneers leaving the peeling machine being immediately taken up and disposed successively by hand, either on said plate 21 or on an auxiliary stacking plate not shown.

In the first case, the stacking operation requires a short reciprocal movement for causing the whole rear part of the veneer which has just been peeled to leave the oblique slit 20 by driving it forward and to bring said rear part rearwards until the heel of the veneer abuts against the rear end 28 of the inlet table 3. In the second case, assuming that the auxiliary stacking plate is provided with an end stop and is disposed in the extension of the above plate 21 and therebelow, the stacking operation requires a long forward driving movement and involves precise lateral guiding of the veneer for stacking on said auxiliary plate.

This result may also be obtained mechanically if, after each peeling pass, plate 21 executes first of all a forward movement whose distance is at least equal to the length of the oblique slit 20, this forward movement having to take place with bottom to top support against the whole front part of the already peeled veneer, said part itself bearing against the lower surface 27 of the outlet table 4. Plate 21 must then execute a return movement which preferably takes place away from the outlet table, either a movement in the form of an arc of a circle, or an approximately rectangular movement, the means for obtaining all these movements being well known by specialists.

But, preferably, in accordance with another essential feature of the longitudinal peeling machine of the invention, plate 21 for receiving and stacking peeled veneers 22 is movable longitudinally and is connected to the means 29 for driving balk 9 so as to be driven exactly in synchronism with said balk 9, as is shown by the connecting line and arrow 30 in FIG. 1. The result is that the lower face 26 of balk 9 being peeled and the upper face 23 of plate 21 or of the last previously peeled veneer 24 are driven exactly in synchronism along the two superimposed stages, i.e. respectively along the upper peeling stage 7 and along the lower reception and stacking stage 25.

In all these cases, because the height of the stack of peeled veneers 22 increases by a veneer thickness at each peeling pass, it is necessary for the reception and stacking plate 21 for the veneers to be adjustable in height, as was mentioned above. Using perfectly well known techniques, employing more particularly feelers and electrically controlled motors, this height adjustment may be entirely automated. It may however be useful to dispose, just at the inlet of the inlet table 3 and in the extension of its lower surface 25, a horizontal metal sheet not shown, whose free front end is bent upwards or is raised in the form of an arc of a circle for facilitating the passage of the front end of the stack of previously peeled veneers 2, under the inlet table 3. Furthermore, plate 21 may be flexible so as to distribute uniformly the bearing pressure of the flat and relatively flexible veneers against the lower face of the cutting table during movement of the stack in synchronism with balk 9, said stack receiving the veneer 10 being peeled and geometric stacking taking place automatically because of the small thickness of the cutting table 2 and because the advance of the stack is synchronised with that of balk 9.

In accordance with another essential feature of the longitudinal peeling machine of the invention, each of the inlet 3 and outlet 4 tables comprises a network of channels 31 opening here and there into the upper surface 7 or 8 of said table 3 or 4, the two networks being connected to a vacuum pump 32 so as to form the means for applying and holding balk 9 against the cutting table 2 under the effect of the atmospheric pressure, the means 29 for driving the balk 9 in the longitudinal advancing direction being reduced to a pushing device.

In another preferred embodiment, channels 31 are formed by horizontal grooves 33 formed in the respective upper faces 7 and 8 of the inlet 3 and outlet 4 tables and by respective plates 34 and 35 fixed to said upper faces and formed with vertical or oblique holes 36 opening into said grooves 33.

In accordance with another feature of the longitudinal wood peeling machine of the invention, each of the inlet 3 and outlet 4 tables includes a network of channels closed at their ends 37 through which a heating fluid flows, the two networks being connected to a device 38 for heating and pumping the fluid intended to heat the inlet table 3 and the outlet table 4 with the associated knife 5 until a temperature of about 150° C. to 200° C. is reached, such a device possibly comprising for example a boiler with its circulation pump. The result is that the lower face 26 of the balk 9 being peeled is dried during its advance along the upper peeling stage 7 and that the veneer 19 being peeled undergoes a beginning of drying during its downward movement through the oblique discharge slit 20 and a complement of drying during its advance along the lower reception and stacking stage 25.

Under these conditions, the veneer 10 which leaves the longitudinal peeling machine 1 and which joins the stack of previously peeled veneers 22 is perfectly flat, is dried and is stacked perfectly geometrically on the other veneers. To obtain better drying, without impairing the thin cutting table 2 under the effect of the steam and, consequently, without any stain or condensation mark on the veneer, it is advantageous for the inlet 3 and outlet 4 tables to be made from solid good heat conducting elements, e.g. from a light alloy or, preferably, a stainless steel, such as those used for hydraulic press plates. Similarly, plates 34 and 35, which are respectively fixed to the inlet 3 and outlet 4 tables comprising horizontal grooves 33, are preferably made from stainless steel. In addition, in order to facilitate discharge of the steam and, consequently, the drying of the veneers, the lower surfaces 25 and 27 of the inlet 3 and outlet 4 tables may be grooved in a zig zag pattern or obliquely or, preferably, with a symmetrical herring bone pattern, not shown, such grooves avoiding corrugation deformations or colored scores of the veneers which might be caused by longitudinal grooves.

Referring more particularly to FIGS. 2 and 3, according to an essential feature of the wood peeling installation of the invention, it comprises at least one wood peeling machine 1, such as described above, said machine being mounted fixedly in a rectilinear part 39 of a closed circuit 40 having two superimposed stages, which are respectively on a level with the two superimposed stages 7 and 25 of the wood peeling machine.

More precisely, this closed circuit 40 comprises an upper horizontal track 41 disposed on a level with the upper peeling stage 7 of the peeling machine 1, for supporting a train of identical rigid mobile frames 42, having preferably a general rectangular shape, each of which is connected to the preceding one and to the following one and comprises at least one pusher 43 for fixing a balk 9 to be peeled longitudinally and laterally inside said frame 42. Preferably, the pusher means 43 acts in the same direction as the centrifugal force exerted on each balk 9 inside its associated frame 42 in the parts in the form of an arc of a circle of the closed circuit 40.

Said closed circuit 40 also has a lower horizontal track 44 for supporting a train of identical mobile rigid carriages 45, preferably with a general rectangular shape identical to that of frames 42. Each carriage 45 is connected to the preceding carriage and to the following carriage and bears an elevator table 46 with a plate 21 which may be flexible. For example, the elevator table 46 is of the type generally called "X" and is controlled automatically in a way known per se by means of feelers and electric motors not shown, so as to exert a constant application pressure oriented upwardly and fixed beforehand. Furthermore, it is possible to dispose an air cushion mattress 47 between the elevator table 46 and plate 21 so that the constant pressure applied by table 46 is exerted at the level of plate 21 in the form of a uniformly distributed pinpoint pressure. Said plate 21, which is thus adjustable in height, as is shown by the two vertical arrows of opposite directions F and F', and is obviously intended for receiving and stacking peeled veneers 22, is adjusted so that the upper face 23 of said plate 21 or of the last previously peeled veneer 24 is disposed on a level with the lower reception and stacking stages of the peeling machine 1, the height of the elevator table being corrected as the height of the stack of cut veneers 22 increases.

In the closed circuit 40 with two superimposed stages 7 and 25 respectively associated with two superimposed tracks 41 and 44, the number of frames 42 is obviously equal to the number of carriages 45, each frame 42 being superimposed on a carriage 45 and a drive means, preferably common, is intended to drive the trains of frames 42 and carriages 45 exactly in synchronism over their respective tracks 41 and 44.

Furthermore, as shown schematically in FIG. 2, the upper track 41 comprises an upper station 48 for loading green balks and the lower track 44 comprises a lower station 49 for unloading stacks of cut, flat and dried veneers 22. Considering the position of knife 5 of the longitudinal peeling machine 1, which determines the travel direction of the trains of superimposed frames and carriages in the direction of arrow A, it is preferable for loading to take place, while the trains are stopped, in the direction of arrow C rather than in the direction of arrow C', so that balk 9 may be jammed in a single movement in abutment against the rear transverse wall 50 of frame 42 stopped opposite said loading station 48. Similarly, depending on the gripping and thrust techniques used, it may be preferably to dispose the unloading station 49 so that said unloading of the stacks of cut veneers 22 may take place, while the trains are stopped, in the direction of arrow D or in the direction of arrow D'.

According to another essential feature of the wood peeling installation of the invention, the upper horizontal track 41 is formed by jointingly juxtaposed plates 51 having exactly the same thickness as the inlet 3 and outlet 4 tables of the wood peeling machine 1. Furthermore, said plates 51 may comprise networks of channels opening into their upper surfaces 52 and connected to one or more vacuum pumps, not shown, so that each balk 9 jammed in its associated mobile frame 42 is applied and held against the upper track 41 while said frame is driven therealong. Finally, said plates 51 may also comprise networks of channels closed at their ends connected to one or more devices for heating and pumping heating fluid, not shown, so that the whole of the stage corresponding to the upper track 41 forms the upper drying and peeling stage 7 for the balks 9 fixed in their respective frames 42 and so that the whole of the stage corresponding to the lower face of the juxtaposed plates 51 and of the peeling machine 1 forms the lower stage 25 for complete drying of the veneers 22 stacked on the respective plates 21 of the carriages 45 with elevator table 46.

In a preferred embodiment, the means for driving the trains of upper frames 42 and lower carriages 45 in synchronism comprises a motor 53 whose output pinion 54 meshes with two large toothed wheels 55 fixed on two main vertical shafts 56 mounted for rotation on a fixed bed 57 on each side of the upper 41 and lower 44 tracks, preferably at the median level of the peeling machine 1. Moreover, upper 58 and lower 59 main drive wheels are fixed on each of the two main shafts 56 and mesh respectively with opposite racks 60 and 61 fixed to the outer lateral faces 62 and 63 of frames 42 and carriages 45, the latter being held in position by respective stiffening elements 64 and 65. In addition, upper and lower inlet 66 and outlet 67 secondary drive wheels, intended both for the longitudinal drive and the transverse holding of frames 42 and carriages 45 and similar to the upper 58 and lower 59 main drive wheels are fixed on secondary vertical inlet 68 and outlet 69 shafts mounted for rotation on bed 57 and also mesh with said racks 60 and 61, the secondary inlet 66 and outlet 67 wheels being respectively driven by said main drive wheels 58 and 59 by means of upper and lower inlet 70 and outlet 71 intermediate pinions fixed on short vertical intermediate inlet 72 and outlet 73 shafts mounted for rotation on bed 57. Because the length of racks 60 and 61 is very much greater than the distance separating respectively two successive frames 42 and two successive carriages 45, the opposite rack of a superimposed frame 42 and carriage 45 still mesh with the set of upper and lower outlet drive wheels 67 when the opposite racks 60 and 61 of the following frame 42 and carriage 45 mesh with the set of upper and lower inlet 66 drive wheels, so than the trains of frames 42 and carriages 45 are driven in synchronism without interruption under the control of motor 53.

According to further features of the wood peeling installation of the invention, each upper frame 42 and each lower carriage 45 is mounted on four support wheels 74, the tread of the wheels associated with frames 42 being appreciably greater than the transverse dimension of knife 5 of the peeling machine 1. In this respect, the running tracks corresponding to the wheels of frames 42 necessarily have a slight projection at the level of the passage from inlet table 3 to outlet table 4. In the case where the veneer is thick, said projection is relatively large and it may be necessary, in order to facilitate the passage of the support wheels 74, to use flexible connection strips not shown and generally secured to one of the inlet or outlet tables.

The successive frames 42 and carriages 45 of each train are further connected to each other by rods 75 which are appreciably shorter than the opposite lateral racks 60, 61 and which are pivotally connected to the two ends 76, 77 of the outer lateral faces 62, 63 of the outermost of the respective frames 42 and carriages 45, said ends 76, 77 being provided with lateral guide wheels 78, 79 mounted on vertical shafts and bearing against vertical barriers 80, 81 in the form of an arc of a circle disposed fixedly on each of the upper 41 and lower 44 tracks.

In a preferred embodiment of the wood peeling installation of the invention, the closed circuit 40 comprises two rectilinear sections 39, 82, connected together by two barrier sections 80, 81 in the form of a semi-circle, a second longitudinal peeling machine 83 being mounted fixedly in the second rectilinear section 82. In this embodiment, the frames 42 and carriages 45 are held transversely and driven longitudinally in the direction of arrow B, at the level of the second peeling machine 83, by an assembly of toothed wheels meshing with the output pinion 54 of motor 53 and symmetrical with the assembly of toothed wheels associated with the first peeling machine 1. The result is that the number of cut veneers 22 is doubled and that the stoving and drying times are reduced by half for the same drive speed.

It is obvious that the wood peeling installation of the invention may comprise more than two longitudinal peeling machines at the level of which the upper frames 42 and the lower carriages 45 are held in position transversely and driven longitudinally in synchronism over the superimposed tracks 41 and 44 of a closed circuit of the required shape.

During operation of the installation of the invention, the balk 9 jammed in each frame 42 is driven along the upper track 41 while being held in position by the atmospheric pressure against the upper faces of the juxtaposed plates 51 and of the inlet 3 and outlet 4 tables of the longitudinal peeling machines. At the level of each machine, each balk 9 loses a veneer 10 which is immediately taken up by the corresponding lower carriage 45 and added to the stack of cut veneers 22 which it is transporting, said veneers being flat and geometrically stacked progressively during the peeling passes, stoving and pre-drying of the balk as well as drying of last peeled veneer depending on the duration of the heated path between two peeling passes. Consequently, in the case of thick veneers, it is preferable to use a single longitudinal peeling machine in the closed circuit and, the thinner the veneers the more advantageous it is to insert an increasing number of peeling machines in said closed circuit. Moreover, it should be noted that the thickness of the veneers is adjusted for each peeling machine but that this latter may peel several successive balks, e.g. eight balks in the embodiment shown in FIG. 2.

It should be understood that the present invention has been described and shown solely by way of non limitative explanation and that any useful modification may be made thereto particularly within the field of technical equivalences, without departing from its scope and spirit.

What is claimed is:

1. A longitudinal wood peeling machine utilizable in a wood peeling installation, said machine comprising a generally rectangular cutting table having external longitudinal edges and formed by an inlet table having flat horizontal upper and lower faces, a rear part and a rear face, an outlet table having flat horizontal upper and lower faces and a front part, a knife having a front part and a cutting edge and being adjustably embedded in said front part of said outlet table, said flat horizontal upper faces of said inlet and outlet tables being disposed to support a lower face of green wood balk during advancement and before and after peeling of a veneer, therefrom, said tables being adjustable in height with respect to each other according to a thickness of veneer to be peeled, said cutting edge of said knife and said rear face of said inlet table being disposed to face each other along a diagonal of said cutting table to form an angle of about 10° with an advancing direction of said balk, which is longitudinal with respect to grain of said green wood balk;

a means for driving said balk in a longitudinal direction and a generally vertical means for applying and holding said balk against said cutting table, a lateral alignment stop provided at a level of said external longitudinal edge of said cutting table which is opposite said knife for holding said balk in said longitudinal direction during peeling;

said rear part of said inlet table and said front parts of said knife and of said outlet table having surfaces of complementary shapes defining an oblique slit therebetween for discharging said veneer downwards during peeling.

said inlet table and said outlet table being thin and having exactly the same thickness, a plate for receiving and stacking said peeled veneers which is adjustable in height and disposed below said cutting table, wherein the upper face of said plate or of a last peeled veneer is substantially at a height of said lower face of said inlet table, said upper and lower faces of said thin inlet table defining two superimposed stages of an upper peeling stage corresponding to said lower face of said balk before peeling said veneer in progress and a lower reception and stacking stage corresponding to said upper face of said plate or of said last peeled veneer.

2. The longitudinal wood peeling machine of claim 1, wherein said receiving and stacking plate is movable longitudinally and is connected to said means for driving said balk in synchronism with said balk, so that said lower face of said balk being peeled and said upper face of said plate or of said last peeled veneer are driven in synchronism along said two superimposed stages, respectively along said upper peeling stage and along said lower reception and stacking stage.

3. The longitudinal wood peeling machine of claim 1, wherein each of said inlet and outlet tables comprises a network of channels emerging at the level of said upper face of said tables, said networks being connected to a vacuum pump to form means for applying and holding said balk against said cutting table under the effect of atmospheric pressure, said means for driving said balk in said longitudinal advancing direction being to a pushing device.

4. The longitudinal wood peeling machine of claim 1 wherein said channels are formed by horizontal grooves formed in said upper faces of said inlet and outlet tables and by plates fixed to said upper faces and formed with vertical or oblique holes opening into said grooves.

5. The longitudinal wood peeling machine of claim 1 wherein each of said inlet and outlet tables includes a network of blind channels through which a heating fluid flows, said two networks being connected to a device for heating and pumping said fluid for heating said inlet table and said outlet table with said knife, so that said lower face of said balk being peeled undergoes stoving during advancement along an upper peeling stage and so that said veneer being peeled undergoes a beginning of drying during a downward movement through said oblique discharge slit and a complement of drying during advancement along said lower reception and stacking stage.

6. A wood peeling installation comprising at least one longitudinal wood peeling machine as claimed in claim 11 wherein said wood peeling machine is mounted fixedly in a rectilinear part of a closed circuit having two superimposed stages, which are on a level with said two superimposed stages of said wood peeling machine and which comprise:

an upper horizontal track disposed on a level with said lower peeling stage of said peeling machine for supporting a train of identical rigid mobile frames having a general rectangular shape with outer lateral faces, each of which frame is connected to a preceding one and to a following one and comprising a pusher means for fixing a balk to be peeled longitudinally and laterally inside of said frame, and a lower horizontal track for supporting a train of identical mobile rigid carriages with outer lateral faces, each of which carriage is connected to a preceding one and to a following one and having an elevator table with a plate which is flexible and supported by an air cushion mattress, said plate being adjustable in height and disposed to receive and stack cut veneers' is adjusted so that the upper face of said plate or of said last peeled veneer is disposed on a level with said lower reception and stacking stage of said peeling machine, wherein frame numbers are equal to carriages numbers, each frame being superimposed on a carriage, and a drive means is provided for driving trains of frames and carriages in synchronism over their respective tracks, said upper track comprising a station for loading green balks and said lower track comprising a station for unloading stacks of cut, flat and dried veneers.

7. The installation as claimed in claim 6, wherein the upper horizontal track is formed by jointingly Juxtaposed plates having a same thickness as said inlet and outlet tables of said wood peeling machine, said plates comprising networks of channels emerging at a level of their upper faces and connected to one or more vacuum pumps so that each balk fixed in its associated mobile frame is applied and held against said upper tracks while said frame is driven therealong, said plates comprising networks of blind channels connected to one or more devices for heating and pumping a heating fluid so that the whole of the stage corresponding to said upper track forms said upper stoving and peeling stage for said balks fixed in their respective frames and so that the whole of a stage corresponding to said lower face of said Juxtaposed plates and of said peeling machine forms said lower stage for complete drying of said veneers stacked on said plates of said carriages with an elevator table.

8. The installation as claimed in claim 6 wherein said means for driving said trains of upper frames and lower carriages in synchronism comprises a motor having output pinion meshes with two large toothed wheels fixed on two main vertical shafts mounted for rotation on a fixed bed on each side of said upper and lower tracks, at a median level of said peeling machine, said upper and lower main drive wheels being fixed on each of said two main shafts and meshing with opposite racks fixed to said outer lateral faces of said frames and of said carriages, upper and lower inlet and outlet secondary drive wheels, disposed both for a longitudinal drive and a transverse holding of said frames and carriages and similar to said upper and lower main drive wheels are fixed on secondary vertical inlet and outlet shafts mounted for rotation on said bed and meshing with said racks and being driven by said main drive wheels by means of upper and lower inlet and outlet intermediate pinions fixed on short vertical intermediate inlet and outlet shafts mounted for rotation on said bed, the length of said racks being greater than a distance separating two successive frames and two successive carriages, so that opposite racks of a superimposed frame and carriage still mesh with said set of upper and lower outlet drive wheels when the opposite racks of a following superimposed frame and carriage engage with said set of upper and lower inlet drive wheels.

9. The installation of claim 6, wherein each upper frame and each lower carriage is mounted on four support wheels, the tread of the wheels associated with said frames being greater than a transverse dimension of said knife of said peeling machine, and said successive frames and carriages of each train are connected to each other by rods which are shorter than said opposite lateral racks and which are pivotally connected to two ends of the outermost of said outer lateral faces of said frames and carriages; said ends being provided with lateral guide wheels mounted on vertical shafts and bearing against vertical barriers in the form of an arc of a circle disposed fixedly on each of said upper and lower tracks.

10. The installation of claim 6 wherein said closed circuit comprises two rectilinear sections connected together by two barrier sections in the form of a semicircle, a second longitudinal peeling machine being mounted fixedly in a second rectilinear section, said frames and carriages being held transversely and driven longitudinally at a level of said second peeling machine by a set of toothed wheels meshing with said output pinion of said motor and being symmetrical with said set of toothed wheels associated with said first peeling machine, so that a number of peeled veneers is doubled and stoving and driving times are reduced by half for a same drive speed.

* * * * *